US010985940B2

(12) United States Patent
Miners et al.

(10) Patent No.: US 10,985,940 B2
(45) Date of Patent: Apr. 20, 2021

(54) CONFIGURABLE OBD ISOLATION

(71) Applicant: IMS SOLUTIONS, INC., Schaumburg, IL (US)

(72) Inventors: William Ben Miners, Guelph (CA); Otman A. Basir, Waterloo (CA); Jason Toonstra, Elmira (CA)

(73) Assignee: Appy Risk Technologies Limited, Cheshire (GB)

( * ) Notice: Subject to any disclaimer, the term of this patent is extended or adjusted under 35 U.S.C. 154(b) by 856 days.

(21) Appl. No.: 15/144,319

(22) Filed: May 2, 2016

(65) Prior Publication Data
US 2017/0026196 A1 Jan. 26, 2017

Related U.S. Application Data

(60) Provisional application No. 62/156,010, filed on May 1, 2015.

(51) Int. Cl.
H04L 12/403 (2006.01)
G07C 5/08 (2006.01)
G07C 5/00 (2006.01)
H04Q 9/00 (2006.01)
H04L 12/40 (2006.01)

(52) U.S. Cl.
CPC ............ H04L 12/403 (2013.01); G07C 5/008 (2013.01); G07C 5/085 (2013.01); H04Q 9/00 (2013.01); G07C 2205/02 (2013.01); H04L 2012/40273 (2013.01)

(58) Field of Classification Search
CPC ........ H04L 12/403; H04L 2012/40273; G07C 5/008; G07C 5/085; G07C 2205/02; H04Q 9/00
See application file for complete search history.

(56) References Cited

U.S. PATENT DOCUMENTS

| 8,918,547 | B2 * | 12/2014 | Cawse ..................... H04Q 9/00 710/15 |
| RE47,354 | E * | 4/2019 | Flick ................. G08B 21/0269 |
| 2007/0002790 | A1 * | 1/2007 | Kasprzyk ............... G07C 5/008 370/328 |
| 2008/0082221 | A1 * | 4/2008 | Nagy .................... G07C 5/008 701/2 |

(Continued)

Primary Examiner — Un C Cho
Assistant Examiner — Shah M Rahman
(74) Attorney, Agent, or Firm — Carlson, Gaskey & Olds, P.C.

(57) ABSTRACT

An on-vehicle device for a driver monitoring system can be configured to be isolated from the vehicle bus while connected to the vehicle's OBD port. In a fully-isolated mode, the device only receives power and ground from the vehicle's OBD port and there is no other communication sent or received from the vehicle bus. In a passive mode, the device can obtain some information from the vehicle bus but does not request any information on the vehicle bus. The device may be undetectable on the vehicle bus. Optionally, the device receives commands via a communication interface to be switched among the three modes: fully active mode, fully isolated mode and passive mode. The commands may come from a server and may be communicated over the internet or over a cell network to a communication module on the device.

16 Claims, 1 Drawing Sheet

(56) References Cited

U.S. PATENT DOCUMENTS

| | | | | |
|---|---|---|---|---|
| 2009/0258642 A1* | 10/2009 | Golenski | G07C 5/008 | 455/426.1 |
| 2010/0023198 A1* | 1/2010 | Hamilton | B60R 16/03 | 701/31.4 |
| 2011/0112717 A1* | 5/2011 | Resner | G07C 5/085 | 701/31.4 |
| 2012/0203441 A1* | 8/2012 | Higgins | G07C 5/008 | 701/102 |
| 2012/0245786 A1* | 9/2012 | Fedorchuk | H04L 69/18 | 701/29.1 |
| 2012/0290166 A1* | 11/2012 | Wallace | G07C 5/00 | 701/29.2 |
| 2013/0030605 A1* | 1/2013 | Basir | G01C 21/3461 | 701/1 |
| 2013/0041521 A1* | 2/2013 | Basir | B60R 25/33 | 701/1 |
| 2013/0073112 A1* | 3/2013 | Phelan | G06Q 40/00 | 701/1 |
| 2013/0166135 A1* | 6/2013 | Dunsdon | B64F 5/60 | 701/29.3 |
| 2013/0204466 A1* | 8/2013 | Ricci | G06F 17/00 | 701/2 |
| 2013/0211623 A1* | 8/2013 | Thompson | G07C 5/008 | 701/2 |
| 2013/0282228 A1* | 10/2013 | Cawse | G07C 5/08 | 701/32.2 |
| 2013/0318380 A1* | 11/2013 | Behrens | H04L 12/40039 | 713/323 |
| 2014/0025253 A1* | 1/2014 | Rybak | G07C 5/0858 | 701/32.7 |
| 2014/0113619 A1* | 4/2014 | Tibbitts | B60W 40/09 | 455/419 |
| 2015/0187146 A1* | 7/2015 | Chen | G07C 5/02 | 701/31.5 |
| 2015/0210288 A1* | 7/2015 | Luong | H04L 67/125 | 701/49 |
| 2015/0310675 A1* | 10/2015 | Park | G07C 5/008 | 701/31.5 |
| 2015/0356497 A1* | 12/2015 | Reeder | G06Q 10/087 | 705/28 |
| 2015/0371457 A1* | 12/2015 | Bakfan | G07C 5/0841 | 701/29.3 |
| 2016/0012653 A1* | 1/2016 | Soroko | G07C 5/0808 | 340/5.61 |
| 2016/0075293 A1* | 3/2016 | Chun | H04W 4/14 | 701/2 |
| 2016/0161367 A1* | 6/2016 | Chu | G01M 15/02 | 324/433 |
| 2016/0182341 A1* | 6/2016 | Fischer | H04L 12/66 | 370/251 |
| 2017/0039784 A1* | 2/2017 | Gelbart | G07C 5/0808 | |
| 2017/0069144 A1* | 3/2017 | Lawrie-Fussey | G06Q 10/20 | |
| 2017/0287322 A1* | 10/2017 | Drake | G07C 5/008 | |
| 2019/0188761 A1* | 6/2019 | Dheedene | G07B 15/02 | |

* cited by examiner

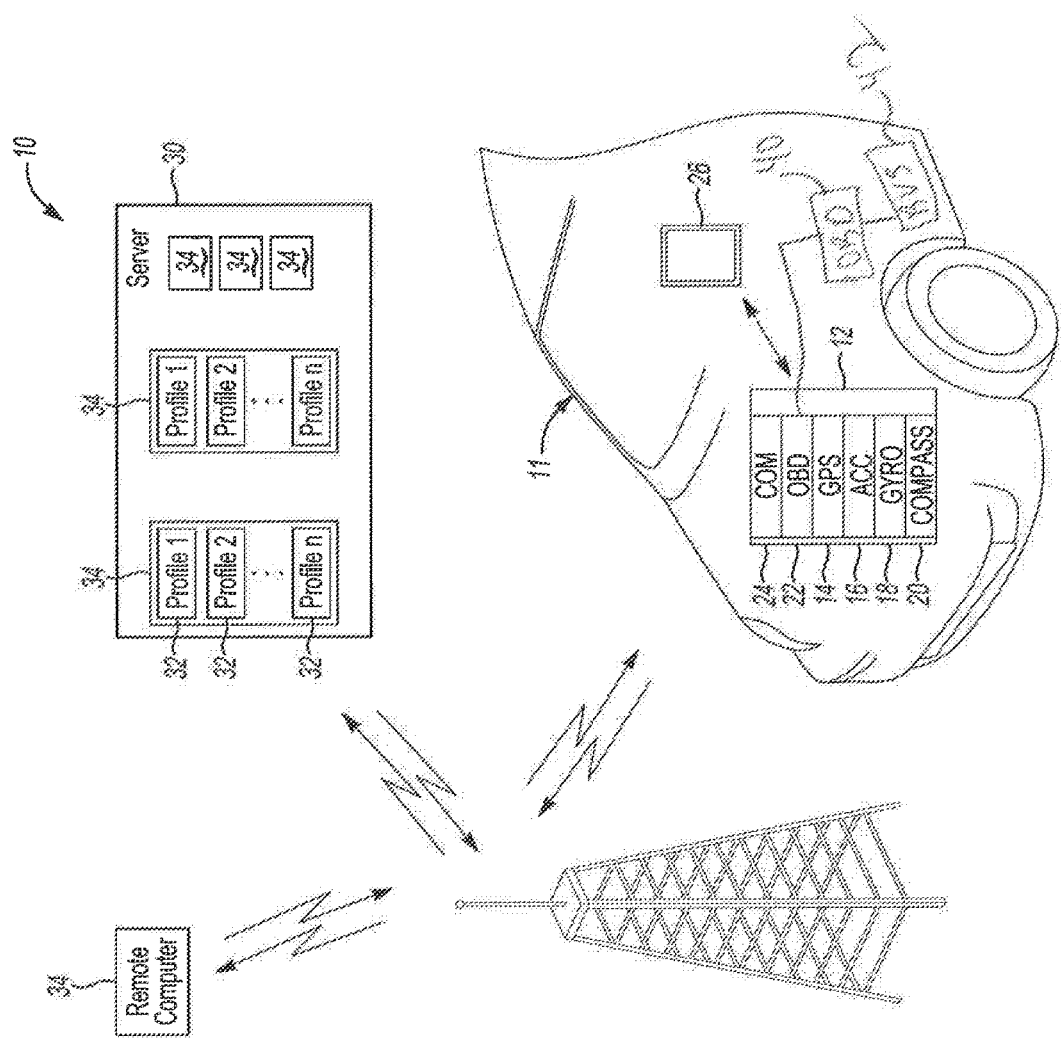

CONFIGURABLE OBD ISOLATION

BACKGROUND

Many vehicle telematics devices include modules that connect to the vehicle data bus on the vehicles. Lots of information is available to the telematics module that connects to the vehicle bus. However, some vehicle systems react negatively to third party devices on the vehicle bus.

SUMMARY

An on-vehicle device for a driver monitoring system can be configured to be isolated from the vehicle bus while connected to the vehicle's OBD port. In a fully-isolated mode, the device only receives power and ground from the vehicle's OBD port and there is no other communication sent or received from the vehicle bus. In a passive mode, the device can obtain some information from the vehicle bus but does not request any information on the vehicle bus. The device may be undetectable on the vehicle bus.

Optionally, the device receives commands via a communication interface to be switched among the three modes: fully active mode, fully isolated mode and passive mode. The commands may come from a server and may be communicated over the internet or over a cell network to a communication module on the device.

BRIEF DESCRIPTION OF THE DRAWINGS

FIG. 1 is a schematic of one embodiment of the present invention.

DETAILED DESCRIPTION OF A PREFERRED EMBODIMENT

FIG. 1 is a schematic of a driver monitoring system 10 according to one embodiment of the present invention. A motor vehicle 11 includes a plurality of data gathering devices that communicate information to a telematics device 12 installed within the vehicle 11. The example data gathering devices include a global positioning satellite (GPS) receiver 14, a three-axis accelerometer 16, a gyroscope 18 and an electronic compass 20, which could be housed within the device 12 (along with a processor and suitable electronic storage, etc. and suitably programmed to perform the functions described herein). As appreciated, other data monitoring systems could be utilized within the contemplation of this invention. Data may also be collected by an onboard diagnostic interface (OBD) 22 that connects to an OBD port 40 that provides data from the vehicle bus 42. This data on the vehicle bus 42 is indicative of vehicle engine operating parameters such as vehicle speed, engine speed, temperature, fuel consumption (or electricity consumption), engine idle time, car diagnostics (from OBD) and other information that is related to mechanical operation of the vehicle. Moreover, any other data that is available to the vehicle could also be communicated to the device 12 for gathering and compilation of the operation summaries of interest in categorizing the overall operation of the vehicle. Not all of the sensors mentioned here are necessary, however, as they are only listed as examples. The GPS receiver 14 may be sufficient by itself.

The device 12 may also include a communication module 24 (such as cell phone, satellite, wi-fi, etc.) that provides a connection to a wide-area network (such as the internet). Alternatively, the communication module 24 may connect to a wide-area network (such as the internet) via a user's cell phone 26 or other device providing communication.

The in vehicle appliance 12 gathers data from the various sensors mounted within the vehicle 11 and stores that data. The in vehicle appliance 12 transmits this data (or summaries or analyses thereof) as a transmission signal through a wireless network to a server 30 (also having at least one processor and suitable electronic storage and suitably programmed to perform the functions described herein). The server 30 utilizes the received data to categorize vehicle operating conditions in order to determine or track vehicle use. This data can be utilized for tracking and determining driver behavior, insurance premiums for the motor vehicle, tracking data utilized to determine proper operation of the vehicle and other information that may provide value such as alerting a maintenance depot or service center when a specific vehicle is in need of such maintenance. Driving events and driver behavior are recorded by the server 30, such as fuel and/or electricity consumption, speed, driver behavior (acceleration, speed, etc.), distance driven and/or time spent in certain insurance-risk coded geographic areas. The on-board appliance 12 may collect and transmit to the server 30 (among other things mentioned herein): Speed, Acceleration, Distance, Fuel consumption, Engine Idle time, Car diagnostics, Location of vehicle, Engine emissions, etc.

The server 30 includes a plurality of profiles 32, each associated with a vehicle 11 (or alternatively, with a user). Among other things, the profiles 32 each contain information about the vehicle 11 (or user) including some or all of the gathered data (or summaries thereof). Some or all of the data (or summaries thereof) may be accessible to the user via a computer 34 over a wide area network (such as the internet) via a policyholder portal, such as fuel efficiency, environmental issues, location, maintenance, etc. The user can also customize some aspects of the profile 32.

It should be noted that the server 30 may be numerous physical and/or virtual servers at multiple locations. The server 30 may collect data from devices 12 from many different vehicles 11 associated with a many different insurance companies. Each insurance company (or other administrator) may configure parameters only for their own users. The server 30 permits the administrator of each insurance company to access only data for their policyholders. The server 30 permits each policyholder to access only his own profile and receive information based upon only his own profile.

The server 30 may not only reside in traditional physical or virtual servers, but may also coexist with the on-board appliance, or may reside within a mobile device. In scenarios where the server 30 is distributed, all or a subset of relevant information may be synchronized between trusted nodes for the purposes of aggregate statistics, trends, and geo-spatial references (proximity to key locations, groups of drivers with similar driving routes).

The on-board appliance 12 has the ability to isolate the OBD diagnostic interface 22 from the OBD port 40 and vehicle communication bus 42. When this feature is enabled, all communication between the device 12 and the vehicle 11 is suppressed. This feature is configurable such that a default state can be set before shipment. Further, the isolation of the OBD diagnostic interface 22 of the device 12 can be remotely activated and deactivated while in the field via commands sent from server 30 and received by the device 12 over communication module 24.

The isolated mode is implemented in either of two ways: a fully-isolated mode and a passive-only mode.

In the fully-isolated mode, the device 12 electrically isolates the device's OBD interface 22 from vehicle's OBD diagnostic port 40, such that the device 12 only uses power and ground from the Diagnostic Link Connector (DLC). When the OBD interface 22 is disabled (fully isolated), absolutely no communication between the vehicle 11 and device 12 is to be initiated or maintained. When the OBD diagnostic interface 22 is disabled, all communication including any manufacturer proprietary messaging and communication will be suppressed. The activity state of the OBD interface 22 may be indicated in the journey/trip data transferred over the air to the server 30. When the OBD interface 22 is disabled, trip delineation is still required, and the device 12 uses other cues including vehicle battery voltage patterns (detection of ignition state—starting the vehicle, vehicle running, and vehicle off), time-based heuristics and accelerometer triggers.

In passive-only mode, the device 12 may also receive power and ground from the OBD port 40. In passive-only mode, the device 12 receives data passively from the OBD port 40 and vehicle bus 42, such as by "sniffing" data on the bus 42. In this way, the device 12 receives from the vehicle bus 42 data indicative of vehicle engine operating parameters such as vehicle speed, engine speed, temperature, fuel consumption (or electricity consumption), engine idle time, car diagnostics (from OBD) and other information that is related to mechanical operation of the vehicle. Again, the device 12 is undetectable by other devices on the vehicle bus 42. The device 12 does not communicate actively on the vehicle bus 42.

The OBD interface 22 can be enabled and disabled (i.e. switched between isolated (including passive and fully-isolated) and non-isolated) remotely, such as through existing communication interfaces (such as communication module 24). Enabling and disabling the OBD interface 22 preferably coincides with the trip start/end. The device 12 preferably does not enable or disable the OBD interface 22 during a trip. If an enable or disable request is received over the air (i.e. a configuration update), it should go into effect on the next trip.

The device 12 may be configured to activate and deactivate the isolation (and switch between fully-isolated and passive) upon receipt of a secure SMS trigger. A SMS message instructs the device 12 to enable or disable the OBD interface 22. A command to query the status of the OBD interface 22 is also configured.

Device power management features remains unchanged when the device's OBD diagnostic interface 22 is disabled. The device 12 continues to enter all appropriate low power modes regardless of whether communication with the vehicle 11 is enabled or disabled.

An LED on the device 12 may indicate that the OBD interface 22 has been disabled for in-field diagnostic purposes.

The device 12 supports an OBD protocol/modulation detection mechanism. The OBD protocol/modulation detection procedure runs whenever the OBD interface 22 is enabled.

The device 12 maintains all current regulatory and compliance statuses.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. An on-board device for a vehicle monitoring system comprising:
    a communication module;
    an OBD interface for connecting to an on-board diagnostic (OBD) port of a vehicle;
    a processor programmed to accumulate data received via the OBD interface, the processor further programmed to receive commands via the communication module and in response to the commands switch the OBD interface from a first mode to a second mode wherein in the first mode the OBD interface can request and receive data via a vehicle data bus connected to the OBD interface, wherein in the second mode the OBD interface does not request or send any data on the vehicle data bus, wherein in the second mode the OBD interface is capable of receiving data on the vehicle data bus.

2. An on-board device for a vehicle monitoring system comprising:
    a communication module;
    an OBD interface for connecting to an on-board diagnostic (OBD) port of a vehicle;
    a processor programmed to accumulate data received via the OBD interface, the processor further programmed to receive commands via the communication module and in response to the commands switch the OBD interface from a first mode to a second mode, wherein in the first mode the OBD interface can request and receive data via a vehicle data bus connected to the OBD interface, wherein in the second mode the OBD interface does not request or send any data on the vehicle data bus, wherein in the second mode the OBD interface is capable of receiving data on the vehicle data bus, wherein in the second mode the OBD interface is capable of receiving data on the vehicle data bus by sniffing data on the vehicle data bus.

3. The device of claim 2 wherein in the second mode the OBD interface is undetectable via the vehicle data bus.

4. The device of claim 3 wherein the processor is programmed to switch the OBD interface between the first mode and the second mode based upon a command received via the communication module.

5. The device of claim 3 wherein the processor is programmed to switch the OBD interface between the first mode and the second mode based upon an SMS message.

6. An on-board device for a vehicle monitoring system comprising:
    a communication module;
    an OBD interface for connecting to an on-board diagnostic (OBD) port of a vehicle;
    a processor programmed to accumulate data received via the OBD interface, the processor further programmed to receive commands via the communication module and in response to the commands switch the OBD interface from a first mode to a second mode, wherein in the first mode the OBD interface can request and receive data via a vehicle data bus connected to the OBD interface, wherein in the second mode the OBD interface does not request or send any data on the vehicle data bus, wherein in the second mode the device monitors power on the OBD port of the vehicle to detect trip beginning and trip ending.

7. The device of claim 6 wherein the processor is programmed to effectuate a command to change modes only after an end of a trip.

8. An on-board device for a vehicle monitoring system comprising:
- a communication module;
- an OBD interface for connecting to an on-board diagnostic (OBD) port of a vehicle;
- a processor programmed to accumulate data received via the OBD interface, the processor further programmed to receive commands via the communication module and in response to the commands switch the OBD interface from a first mode to a second mode, wherein in the first mode the OBD interface can request and receive data via a vehicle data bus connected to the OBD interface, wherein in the second mode the OBD interface does not request or send any data on the vehicle data bus, wherein the processor is programmed to effectuate a command to change modes only after an end of a trip.

9. The device of claim 8 wherein the processor is programmed to switch the OBD interface between the first mode and the second mode based upon an SMS message.

10. The device of claim 9 wherein in the second mode the OBD interface only receives power and ground via the OBD port of the vehicle.

11. The device of claim 10 wherein the communication module is configured to provide wireless communication.

12. The device of claim 10 wherein the communication module is a cell phone or wifi.

13. The device of claim 10 wherein the communication module is configured to provide wireless communication to the Internet.

14. The device of claim 1 wherein the communication module is configured to provide wireless communication to the Internet.

15. The device of claim 1 wherein the communication module is a cell phone or wifi.

16. The device of claim 1 wherein the communication module is configured to provide wireless communication.

* * * * *